M. L. SHINN & W. H. KIDD.
NUT LOCK.
APPLICATION FILED APR. 17, 1911.
1,009,801.
Patented Nov. 28, 1911.
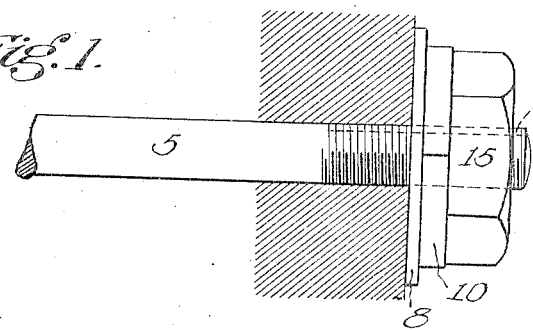
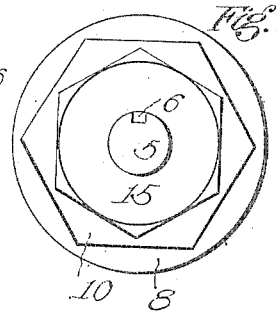
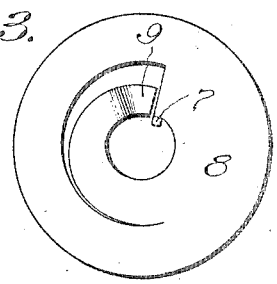
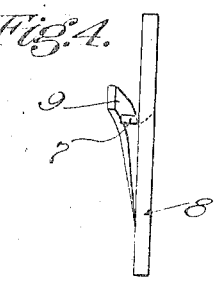
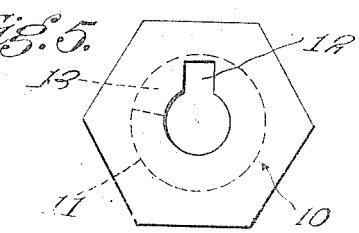
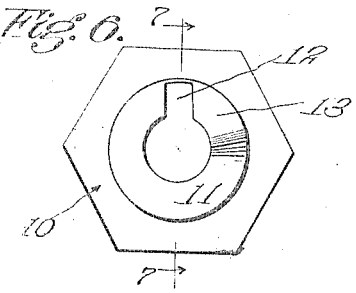
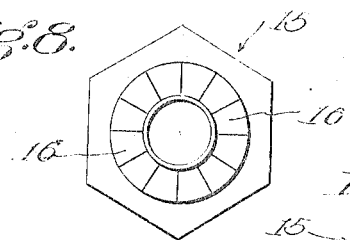
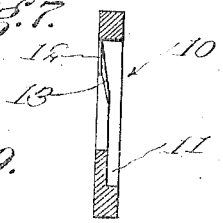
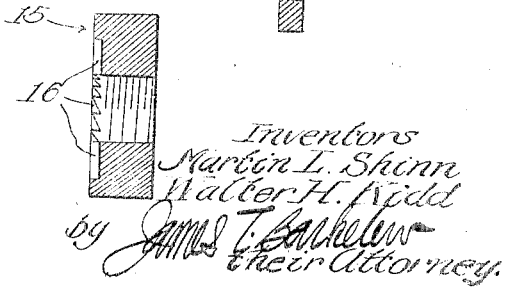
Witnesses
Elwood Barkelew
Fred W Brown
Inventors
Martin L. Shinn
Walter H. Kidd
by James T. Barkelew
their Attorney.

UNITED STATES PATENT OFFICE.

MARTIN L. SHINN AND WALTER H. KIDD, OF LOS ANGELES, CALIFORNIA.

NUT-LOCK.

1,009,801. Specification of Letters Patent. Patented Nov. 28, 1911.

Application filed April 17, 1911. Serial No. 621,579.

*To all whom it may concern:*

Be it known that we, MARTIN L. SHINN and WALTER H. KIDD, both citizens of the United States, residing at Los Angeles, county of Los Angeles, State of California, have invented new and useful Improvements in Nut-Locks, of which the following is a specification.

This invention relates to improvements in our joint invention in nut locks for which we have applied for Letters Patent on November 26th, 1909, the application bearing Serial No. 529,913; and the improvements over our former invention will become apparent from the following. In our former invention we utilized a nut having ratchet teeth which acted in combination with a spring tooth or tongue on a washer which is provided with means to prevent its rotation relative to the bolt. This spring tooth projects through an aperture in a second washer placed intermediate the spring washer and the nut. This aperture has an overhanging wall, so that by turning the intermediate washer the spring tongue can be forced under the overhanging wall and out of engagement with the ratchet teeth of the nut. If the intermediate washer were rotated any considerable distance, the spring tongue would be forced down flat on the spring washer; and many such operations would permanently deform the tongue so that it would not rise to engagement with the ratchet teeth in the nut. For this reason, in our old construction, we have provided stops to prevent any excessive rotation of the intermediate washer. In our present invention the means for preventing deformation of the spring tongue is provided in an entirely different manner, being embodied in a circular groove provided completely around the inner periphery of the intermediate washer, this groove being sufficiently deep to allow the spring tongue to project thereinto and not be deformed when pressed out of engagement with the ratchet teeth in the nut. The intermediate washer is sufficiently thick to provide for this annular groove and for sufficient material over the groove to hold the spring tongue away from the nut. These features will be better understood from the following specification and the accompanying drawings, in which—

Figure 1 is a view showing our improved nut lock as it appears in use, the device being shown in elevation. Fig. 2 is a plan of the device. Fig. 3 is a plan of the spring washer. Fig. 4 is an edge view of the same. Fig. 5 is an upper plan of the intermediate washer. Fig. 6 is a lower plan of the same. Fig. 7 is a section of the intermediate washer taken as indicated by line 7—7 of Fig. 6. Fig. 8 is a bottom plan of the nut. Fig. 9 is a longitudinal central section of the same.

In the drawings 5 designates a bolt of any character and having a longitudinal way or slot 6 cut therein, this longitudinal slot being engaged by an inwardly and longitudinally projecting lug 7 on the inner periphery of spring washer 8. Lug 7 is turned so as to project longitudinally along slot 6 in order to obtain a better engagement with the slot. A spring tongue 9 is stamped out of spring washer 8, the tongue projecting out from the washer somewhat in the fashion illustrated in Fig. 4. (The showing in Fig. 4 is reversed from the position of the spring tongue and washer in Fig. 1; that is, the tongue projects from the right hand side of the washer in Fig. 1 and toward the nut.) Directly over spring washer 8 is placed intermediate washer 10. This washer is provided with an annular groove 11 extending around its inner periphery and on its face adjacent spring washer 8. Groove 11 extends partially through washer 10, and the bottom wall of the groove is apertured at 12 to allow the end of tongue 9 to project upwardly therethrough. Adjacent aperture 12 the wall of the groove is beveled, as shown at 13. Intermediate washer 10 is placed over spring washer 8 in the relative positions shown in Figs. 3 and 5. Spring tongue 9 then projects up under beveled wall 13 and out through aperture 12. Immediately over intermediate washer 10 the nut 15 is placed. Nut 15 is of ordinary structure with the exception of being provided with ratchet teeth 16 on its face which bears against washer 10. It will be seen that the ratchet teeth pass directly over aperture 12 and over the end of tongue 9.

When the parts are all placed in the position shown in Fig. 1, nut 15 being screwed down tightly on the two washers, tongue 9 will engage with the ratchet teeth and prevent the nut from being unscrewed. (In this case the nut turns to the right to tighten and to the left to loosen.) If it is desired to release the nut it is only necessary to turn the intermediate washer 10 in a right handed direction; beveled wall 13 being forced over the tongue 9 and the tongue thus withdrawn from engagement with the ratchet teeth on the nut. The spring tongue is thus forced down into groove 11; but the groove allows it to stand sufficiently high above spring washer 8 that it is not deformed by being pressed down. And it will be seen that intermediate washer 10 can be turned as much as desired without deforming the tongue.

The natural tendency of nut 15 is to turn to the left, and any frictional effects it may have on intermediate washer 10 is to turn it to the left. Turning washer 10 to the left cannot possibly release tongue 9. If anything, the tongue will be pressed upwardly into more secure engagement with the nut by reason of the edge of aperture 12 moving in under the spring tongue. In this manner we have provided that it is impossible for the nut to be removed unless intermediate washer 10 is turned to the right, and such an operation will ordinarily be only accomplished by manual efforts. We have further, and specifically to this invention, provided that the spring tongue cannot be injured by any amount of rotation of the intermediate washer; and we have thus provided a nut lock which is at once sure in its action and incapable of being injured by ignorant manipulation.

Having described our invention, we claim;

1. A nut lock, comprising in combination a bolt having a longitudinal slot in its surface, a nut having ratchet teeth on its under surface, a spring washer surrounding the bolt and having means for engaging said longitudinal slot, a spring tongue projecting from the washer and adapted to engage the ratchet teeth on the nut, and an intermediate washer between the spring washer and the nut, the intermediate washer having an aperture through which the tongue projects, and also having an annular groove in its surface adjacent the spring washer and directly over the spring tongue.

2. A nut lock, comprising in combination a bolt, a nut for the bolt, the nut having teeth on its under surface, a spring washer, means for preventing the rotation of the spring washer on the bolt, a tongue on the spring washer and projecting into engagement with the nut teeth, and an intermediate washer having an aperture therein through which the tongue passes and having an annular groove in its face adjacent the spring washer and over the tongue.

3. A nut lock, comprising in combination a bolt, a nut for the bolt, a spring tongue projecting into engagement with the nut to prevent its rotation in one direction, means to prevent the rotation of the spring tongue with reference to the bolt, and a rotatable member adjacent the nut and having an aperture through which the spring tongue projects to engagement with the nut, the member also being provided with an annular groove on its face away from the nut and adjacent on the tongue.

4. A nut lock, comprising in combination, a screw threaded bolt having a longitudinal slot in its periphery, a nut engaging the screw threads and having ratchet teeth on its under face, a spring washer surrounding the bolt and having a lug extending into said longitudinal slot, a spring tongue formed integrally with the washer and projecting into engagement with the ratchet teeth on the nut, and a washer intermediate the spring washer and the nut and having an aperture through which the tongue passes to engage said ratchet teeth and also having an annular groove in its face adjacent the spring washer and directly over the tongue.

In witness that we claim the foregoing we have hereunto subscribed our names this 8th day of April, 1911.

M. L. SHINN.
WALTER H. KIDD.

Witnesses:
   JAMES T. BARKELEW,
   ELWOOD H. BARKELEW.